UNITED STATES PATENT OFFICE.

EDMUND BECKER, OF WASHINGTON, DISTRICT OF COLUMBIA.

MIXING MORTAR.

1,223,239. Specification of Letters Patent. Patented Apr. 17, 1917.

No Drawing. Application filed February 24, 1912. Serial No. 679,730.

*To all whom it may concern:*

Be it known that I, EDMUND BECKER, a citizen of the United States, residing at Washington, District of Columbia, have invented certain new and useful Improvements in Mixing Mortars, of which the following is a specification.

My invention relates to the common lime or cement mortars of the building trades; that is, to any mixture of sand and water, with lime or cement, as sole active agent of the mixture. The object of my invention is to protect such simple and standard mortar against the well known slow destructive action of certain chemicals that may accidentally be present in the mixture from the beginning, or that may subsequently find their way into the mixture from the surrounding medium.

My experiments have proved the utility of adding to the mortar litharge or other lead compounds, preferably lead acetate. When Portland cement is mixed in accordance with my invention with water containing in solution acetate of lead an active chemical action takes place, as indicated by a relatively high increase in the temperature of the mass. The lead acetate is decomposed by any present acids as well as by those soluble salts the acids of which combine with lead protoxid to form insoluble compounds. Sulfuric and hydrochloric acids, for instance, which are known to be the principal destructive agents of cement, if present, therefore, spend themselves in decomposing the lead acetate to induce the formation of stable lead salts, and the acetic acid thus liberated transforms all the inert oxids into acetates which, being soluble, permeate the whole mass and are intimately incorporated with and protected by the active crystals of the cement until their acetic acid is slowly but ultimately displaced and replaced by the carbonic acid of the air or the water to be converted into permanent carbonates.

Physically the addition of lead acetate to the mortar produces an unctuous, plastic and more agglutinant paste which does not disintegrate, separate or wash apart when cast into the water, and which hardens as a solid and dense mass.

Moreover, when the cement containing a lead oxid is exposed to the action of sulfates and chlorids (which occur in sea water), insoluble sulfates and chlorids of lead and plumbates are formed; the sea water thus adds to the durability of the cement instead of impairing it. The presence of the lead salts leads to similar results when the cement is exposed to certain acid vapors, as sulfurous or hydrochloric acid vapors.

Another advantage arises from the permanency of the lead salts mentioned, since they have no tendency to absorb water of crystallization.

There is this further point to be considered: Owing to the tendency of chemical reaction to take place in that direction which involves the greatest fall in potential and the greatest permanency of the results, the presence of the lead oxid is specially effective in the neutralization of the acids to which the mortar would be exposed and which would tend to destroy it.

Sulfuric and hydrochloric acids, as above stated, have been recognized as the chief destructive agents of masonry; and their noxious action is more rapid in sea water than in air.

Portland cement is of a very varied complex composition, but can be said to consist generally of strongly hydraulic active elements in admixture with varying proportions of inert substances. These so-called inert parts I have found to be the hurtful ingredients of Portland cement and my method has for its object to act on them and to transform them into truly inert or, better, into useful parts.

Analysis of Portland cement shows that, besides the hydraulic cementing elements, there are found:

1. An excess of free lime or calcium oxid;
2. Magnesia or magnesium oxid;
3. An excess of alumina or aluminum oxid;
4. Oxid of iron;
5. Gypsum or calcium sulfate which is ground with the cement as a retarder to make it slow setting;

All of which, with the exception of iron oxid, are more or less soluble in water; but the iron oxid is readily attacked by the sulfuric and hydrochloric acids and changed then into soluble sulfate and chlorid of iron.

When the Portland cement is mixed with the proper quantity of water, the active hydraulic cementing parts combine with said water abandoning the excess of lime under the form of hydrate of lime, the rapid crystallization of which renders the cement quick-setting. A quick-setting cement being of difficult or impossible use, a certain percentage of gypsum is ground with the cement to make it slow-setting.

But, as has been known for centuries, sulfate of lime is a hurtful addition to lime mortars, because it is soluble and has an affinity for water; while keeping well in a dry atmosphere, it "rots" and disintegrates in water or humidity. Hence the quantity of gypsum in Portland cement has been reduced and limited to the lowest percentage possible, and it is highly detrimental for concrete in sea water.

It is the gypsum ground in as a retarder which furnishes the noxious sulfuric acid disclosed in the analysis of Portland cement.

The affinity of magnesia for water being less than that of lime, it is apt to hydrate and swell subsequently to the setting of the mortar.

The above mentioned inert parts being mostly specifically lighter than the cementing parts will ascend and, united by molecular affinity, will gather on top of the mortar or concrete and produce what is called the "Laitance," the cementing properties of which are *nil*. On surfaces of concrete they show when wet and are called water-marks and are in reality incipient cracks. It is through these water-marks and the joints of masonry that the water exudes, loaded with the soluble inert parts, which carbonize into unsightly efflorescences or "whitewash." These exudations leave in the mass of the concrete voids which add to the porosity of and impair the quality of the concrete.

The sulfuric acid and the hydrochloric acid, free or in combination reacting on the lead compounds, form insoluble combinations of anhydrous and stable sulfate and chlorid of lead which serve to render the concrete impervious and inattackable by the acids.

All previous efforts to produce a concrete which can stand in sea water have failed because they did not suppress the causes of decay inherent in the nature of Portland cement. All so-called waterproofing processes are ineffectual attempts at pore filling and do not act permanently. It is only by availing one's self of the greater affinity of the acids in sea water to form insoluble, anhydrous, permanent combinations with the lead components that the solution of the problem can be reached.

I am aware that the addition of acetate of lead to lime or cement mortars has been proposed by Hartnell, in British Patent 8,413 of 1890; also by Bouvier, in British Patent 16,232 of 1888; but the acetate of lead in each of these patents is used in combination with a relatively large proportion of sulfuric acid that enters into violent chemical combination with the lead acetate, virtually destroying it as such.

I am aware that the addition of acetate of lead has also been proposed by Guelick in U. S. Patent 410,688 of 1889, but Guelick uses an infinitesimal part not exceeding one part of acetate in nearly nine thousand (8910) parts of the cement used; and this small fraction enters into combination with his added alum and borax, so that any preservative function such as contemplated in my mortar is absolutely out of question. In my mortar the acetate is used without any other ingredients and it must enter in the proportion of one part of acetate to two hundred parts of lime or cement to be capable of its intended operation.

I claim as my invention:

1. In the process of forming mortars, the step which consists in adding, during the mixing operation, and to the three common basic ingredients of mortar, to wit: (1) lime or cement, (2) water (3) sand; as preservative, a fourth ingredient consisting of a soluble salt of lead, which is adapted to form insoluble salts of lead, with mortar destroying agents; such soluble salt being present in a proportion which exceeds, by weight, one part in two hundred of the lime or cement that is used as sole active agent in the mixture.

2. In the process of forming mortars, the step which consists in adding, during the mixing operation, and to the three common basic ingredients of mortar, to wit: (1) lime or cement (2) water (3) sand; as preservative, a fourth ingredient consisting of acetate of lead; such acetate of lead being present in a proportion which exceeds, by weight one part in two hundred of the lime or cement used as sole active agent of the mixture.

EDMUND BECKER.

Witnesses:
A. M. PARKINS,
CAMILLE HINDMARSH.